United States Patent [19]
Urbas

[11] 3,790,203
[45] Feb. 5, 1974

[54] PARTS HANDLING MEANS

[75] Inventor: Ernest J. Urbas, Richmond Heights, Ohio

[73] Assignee: Guarantee Specialty Manufacturing Company, Cleveland, Ohio

[22] Filed: Sept. 5, 1972

[21] Appl. No.: 286,555

[52] U.S. Cl. .............................. 294/31 R, 81/427
[51] Int. Cl. ............................................ A47j 45/00
[58] Field of Search............ 294/31 R, 29, 28, 27 R; 81/345, 355, 362, 415, 416, 417, 424, 427; 128/303

[56] References Cited
UNITED STATES PATENTS

| | | | |
|---|---|---|---|
| 2,840,082 | 6/1958 | Salvatore | 81/427 X |
| 2,840,081 | 6/1958 | Moose | 128/303 A |
| 1,148,646 | 8/1915 | Wolford | 294/31 R |

Primary Examiner—Evon C. Blunk
Assistant Examiner—James L. Rowland
Attorney, Agent, or Firm—Robb & Robb

[57] ABSTRACT

The disclosure hereof is of parts handling means comprising a scissor-like unit having a handle portion and a part engaging section with a reciprocating member operable by connections with the handle portion, and including a part engaging element which, upon manipulation will move the part engaging element toward the part engaging section whereby parts may be gripped therebetween and manipulated thereafter in the gripped condition, obviating the necessity for an operator of a dangerous machine or the like to place his hand in the line of movement of anything which would possibly injure the hand, whereas the handling means of this invention will manipulate the part readily.

1 Claim, 5 Drawing Figures

PATENTED FEB 5 1974 3,790,203

PARTS HANDLING MEANS

OBJECTS OF THE INVENTION

It is a principal object of this invention to provide a simple parts handling means by which parts which are manufactured or otherwise operated upon in punch presses or other dangerous machinery may be gripped by the handling means and removed from the machine or positioned in another place therewithin, without the necessity for the operator to insert his hand into a dangerous position.

A further object of the invention is to provide parts handling means which are scissor-like in character and upon manipulating in the manner of scissors, will cause a reciprocating member to grip in conjunction with the ends of the means, the part therebetween, so that it may be moved inwardly or outwardly or in any particular position for subsequent operation thereon, or merely released when completed and deposited in a container for movement thereafter.

Another object of the invention is to provide a parts handling means which incorporates reciprocating and scissor-like instrumentalities in one unit, of simple construction, affording a gripping location for parts of various thicknesses which do not depend upon any particular pre-determined motion, but will respond to the gripping action afforded to thereby move the part and position the same in any different location as may be required.

Another object of the invention is to provide a parts handling means which comprises a pair of crossed arms in the scissor-like unit which are pivotally connected at a crossing point to form the part engaging section which is of less length at one side of the pivotal connection than the handle portion, movement of the handle portion by means of links and the connection with a reciprocating member causing the part to be engaged between the ends of the crossed arms and the part engaging element for manipulation thereafter in a gripped position.

Other and further objects of the invention will be understood from a consideration of the specification appended hereto and disclosed in the drawing, wherein.

DESCRIPTION OF THE INVENTION

Figure 1:
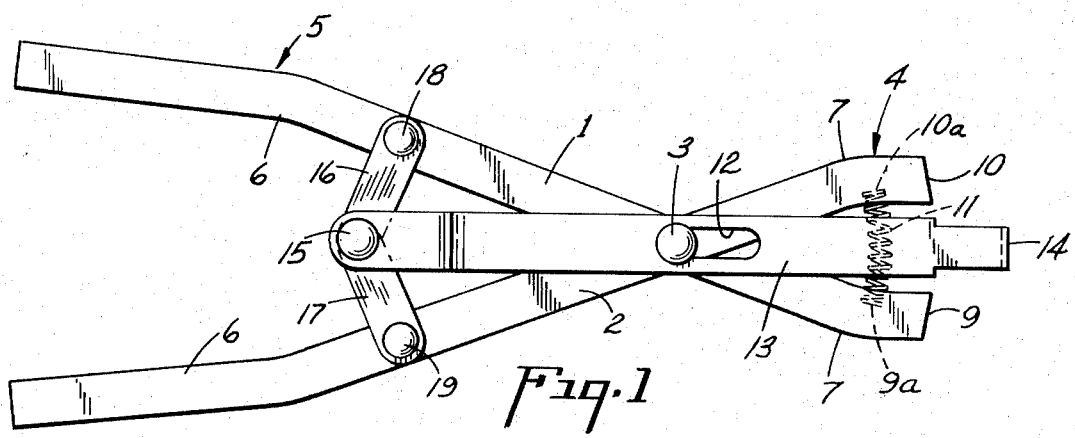
FIG. 1 is a plan view of the parts handling means of this invention in its position prior to grasping a part.

Referring now to FIG. 1, the scissor-like unit which is the basic construction of this invention, includes a pair of crossed arms 1 and 2 which are pivotally connected at 3, designated a crossing point, to form the part engaging section generally indicated at 4 which is of less length at one side of the pivotal connection 3 than the handle portion generally designated 5, lying at the other side of the pivotal connection 3.

Figure 3:
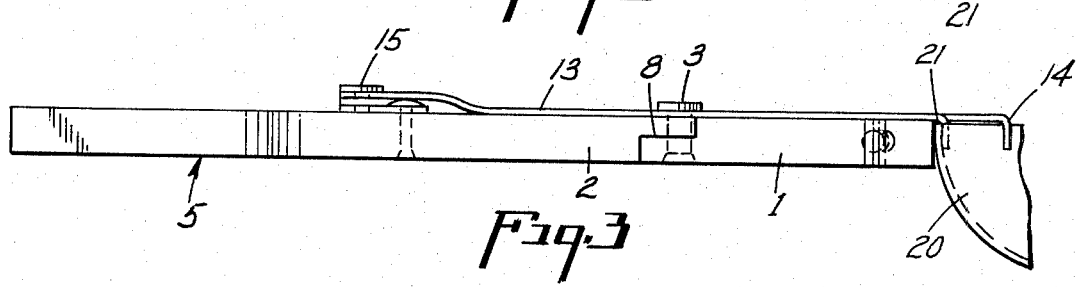
FIG. 3 is a side view of the disclosure of FIG. 2, showing the scope or extreme positions, both open and closed of the parts handling means.
Figure 4:
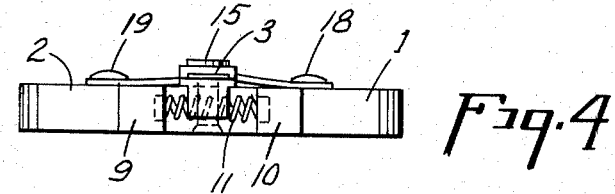
FIG. 4 is an end view of the disclosure of FIG. 1, looking from the right-hand end thereof.
Figure 5:
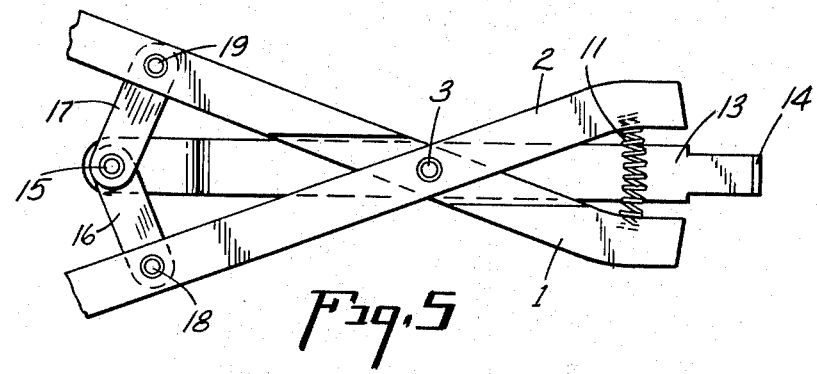
FIG. 5 is a bottom view, partly fragmentary, illustrating additional aspects of construction of the parts handling means.

As will be understood, the arms 1 and 2 consist in this instance of square rod members, bent at 6 and 7 in each case, so that as viewed when disassembled, the parts are substantially identical having suitable cut-out portions such as suggested in FIG. 3 at 8, whereby the same may be positioned so that they lie in the same plane substantially and operate around the pivot 3. The square arms 1 and 2 are provided with square ends 9 and 10 respectively, with a spring 11 interposed between the portions comprising the part engaging section 4 in suitable sockets 9a and 10a respectively.

The pivot 3 is provided with an enlarged head, the enlarged head being designed to extend over the sides of a slot 12 formed about midway between the ends of a reciprocating member 13, which in this instance is a flat element having a down turned end 14 at one end, being more clearly indicated in FIG. 3, and provided with a pivot opening at the other in which a pivot connection 15 is found, this pivot connection in turn providing a common connection for links 16 and 17 which are of substantially identical configuration and in turn pivotally connected at 18 and 19 respectively on the arms 1 and 2.

Figure 2:
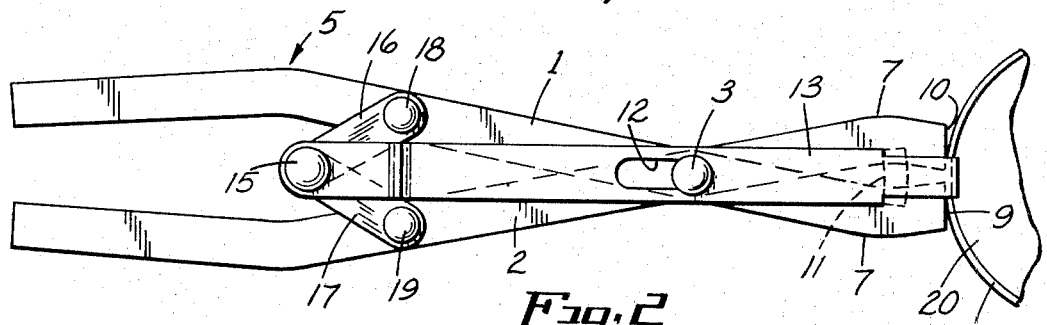
FIG. 2 is a view similar to FIG. 1, but with the parts handling means in part gripping condition, wherein the scissor-like elements are closed and the reciprocating member is moved into position to grip the part.

With the foregoing construction in mind, therefore, it will be understood that by squeezing the arms 1 and 2 at the handle portion 5, by reason of the position of the links 16 and 17, a reciprocating action will be imparted to the member 13, and at the same time closing action will take place at the part engaging section 4 so that the ends 9 and 10 are brought into close proximity and the downturned end 14 of the member 13 is moved leftwardly as viewed in the figures, so that it will grip a part such as is suggested at 20 in FIG. 2, this part in this instance being illustrated as a hemispherical section of rather thin cross section, with a lip 21 shown as gripped in the manner suggested by FIG. 2 and FIG. 3.

It will be understood that by so gripping the part 20, it may be handled without actually contacting the same by the hands of an operator, and the part may thereafter be positioned where necessary, as from one die location to another in punch press operation, for example.

Of course the same facility of movement may be resorted to to remove a part from a punch press, or to place the same in the punch press, obviating the necessity for the operator to place his hands in a condition where the same might be injured.

When the part has been positioned as desired, after having been gripped in the manner disclosed, release of the squeeze action on the handle portion will permit the part to remain in its position and the parts handling means to be withdrawn, so that operation otherwise may be effected, or the part pass on to a further process step.

In view of the adjustability of the respective parts, it will be understood that where thickness is varied, the gripping action will be correspondingly varied or more properly stated, the position at which the gripping action takes place may be widely varied to accept various thicknesses of material between the gripping areas of the respective parts.

I claim:

1. In parts handling means of the class described, in combination, a scissor-like unit having a handle portion and a part engaging section, and a reciprocating member operable by connections with the handle portion and having a part engaging element movable toward the part engaging section to engage a part simultaneously with the section aforesaid, said unit comprising a pair of crossed arms pivotally connected at the crossing point to form the part engaging section of less length at one side of the pivotal connection than the handle portion, a pair of links each of which is pivotally connected at one end to one of the arms and together at the other ends at a point intermediate the same, the reciprocating member having one end likewise connected at said intermediate point, said member including a sliding connection at the crossing point aforesaid, squeezing movement applied to the arms in the handle portion causing the portion of the arms in the part engaging section to move toward each other and the part engaging element to move toward the section referred to simultaneously as stated, resilient means being arranged to extend between said arms to maintain the same in normally separated position overcome by the squeezing movement applied thereto in the handle portion.

* * * * *